Figure 1:
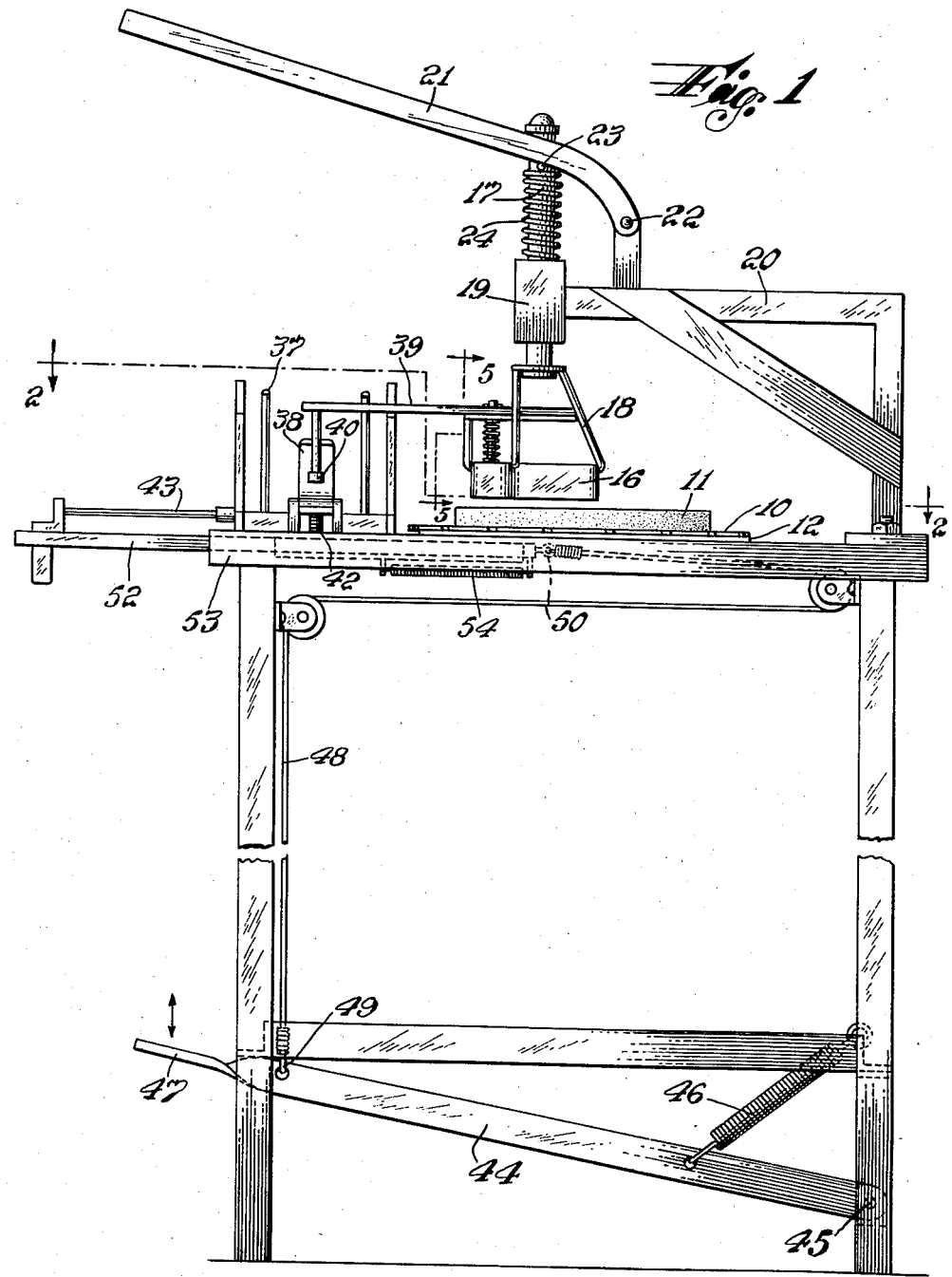

Sept. 16, 1958           J. A. HOOKER           2,851,767
MACHINE FOR AND METHOD OF FABRICATING UNIFORM
SECTIONS FROM A SLICE OF MATERIAL
Filed May 16, 1957                       3 Sheets-Sheet 2
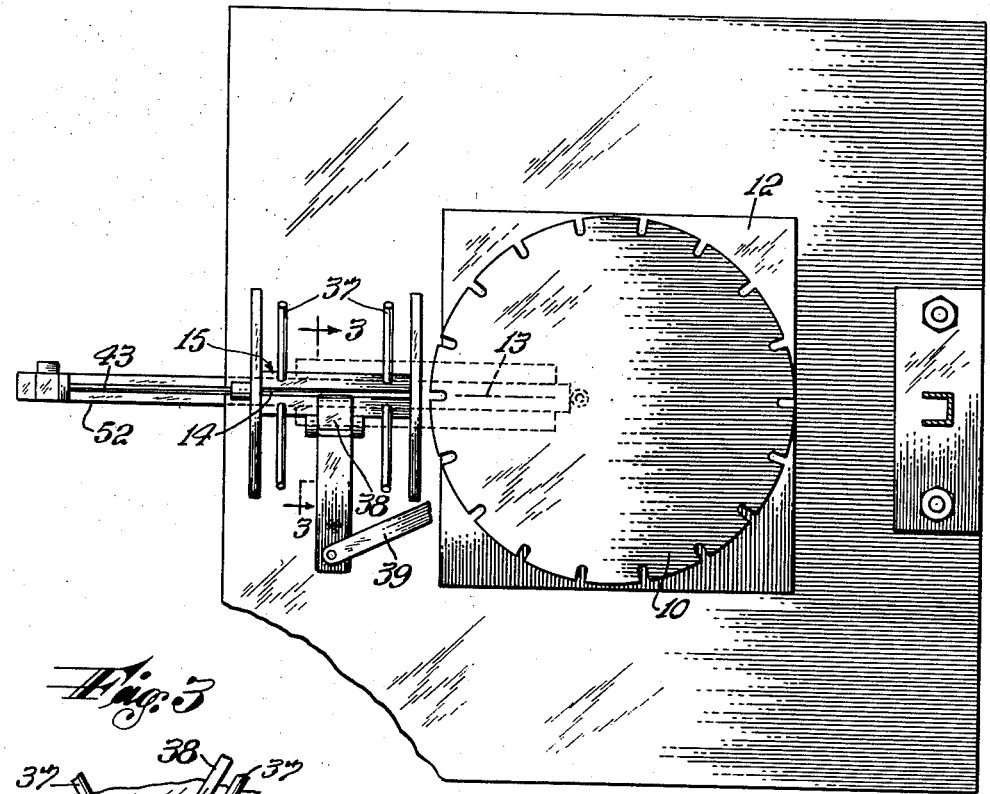
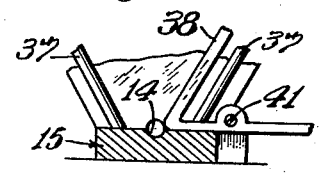
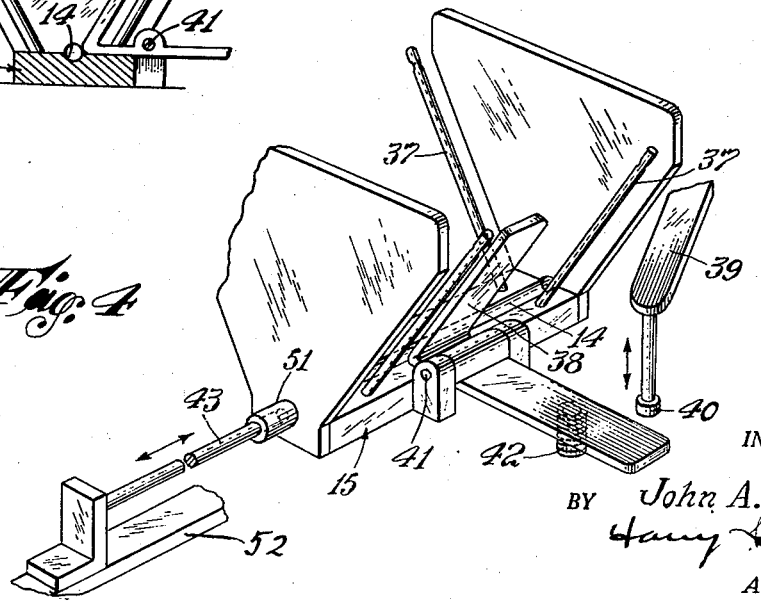
INVENTOR.
BY John A. Hooker
ATTORNEY Sept. 16, 1958 J. A. HOOKER 2,851,767
MACHINE FOR AND METHOD OF FABRICATING UNIFORM
SECTIONS FROM A SLICE OF MATERIAL
Filed May 16, 1957 3 Sheets-Sheet 3
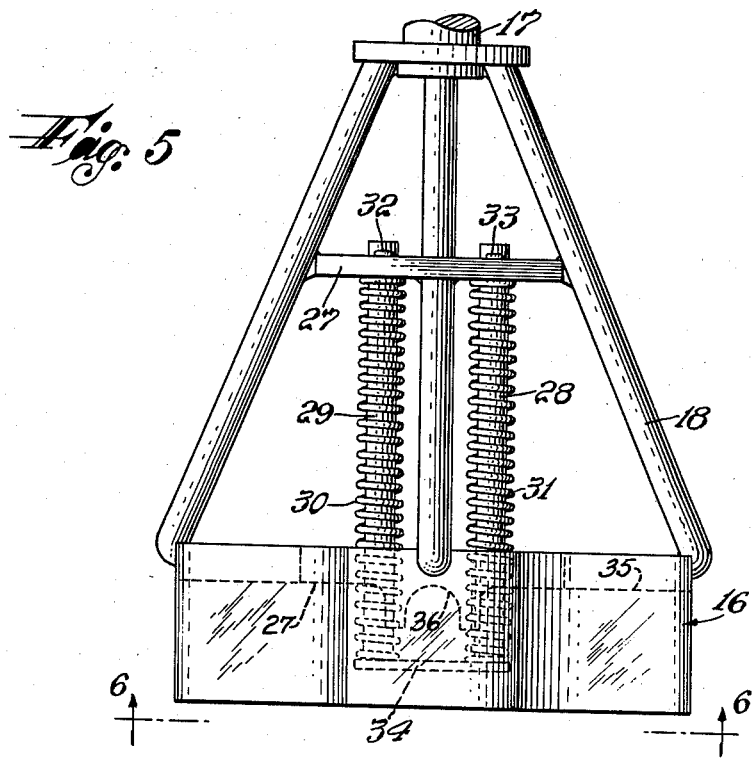
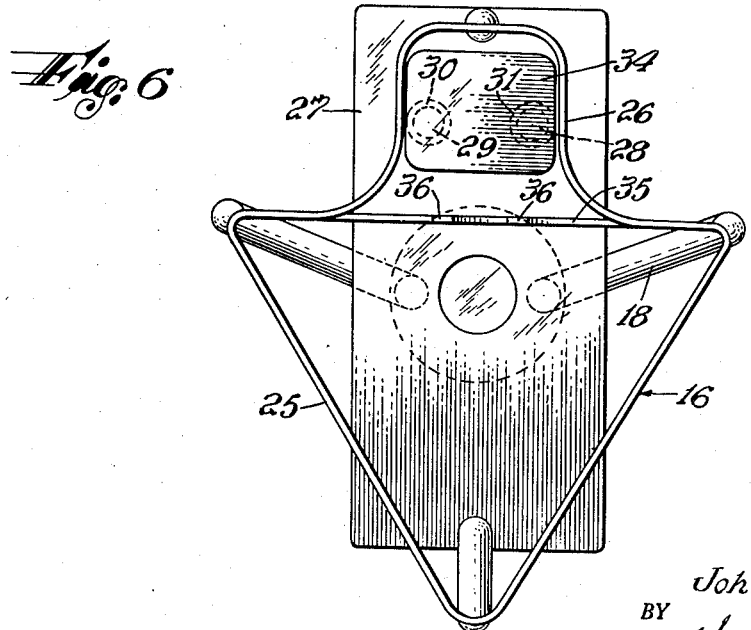
INVENTOR.
John A. Hooker
BY
ATTORNEY

United States Patent Office 2,851,767
Patented Sept. 16, 1958

2,851,767

MACHINE FOR AND METHOD OF FABRICATING UNIFORM SECTIONS FROM A SLICE OF MATERIAL

John A. Hooker, Kearny, N. J., assignor to Mary Bova, Borough of Deal, County of Monmouth, N. J.

Application May 16, 1957, Serial No. 659,602

4 Claims. (Cl. 29—200)

This invention relates to the fabricating of individual sections of uniform outline from a large slice of material. Reference to one use of the invention shall be deemed in no wise to limit the use of the invention, which, as will become obvious from a consideration of the attached drawings and description below, may be readily applied to other uses with equal efficacy. Pursuant to the invention, novel means are provided for the cutting, forming and holding of individual sections from a large slice of material, and for the insertion of handle members therein.

These and other advantageous objects, which will appear from the drawings and from the description hereinafter, are accomplished by the structure of my invention, of which an embodiment is illustrated in the drawings. It will be apparent, from a consideration of said drawings and the following description, that the invention may be embodied in other forms suggested thereby, and such other forms as come within the scope of the appended claims are to be considered within the scope and purview of the instant invention.

In the drawings:

Fig. 1 is an elevational view of a machine for fabricating sections of uniform outline, embodying the invention, Fig. 2 is a top plan, partly sectional view thereof, taken on line 2 of Fig. 1, Fig. 3 is a transverse sectional view taken on line 3—3 of Fig. 2, Fig. 4 is a perspective view of one form of handle holder which may be used in carrying out the invention, Fig. 5 is an enlarged plan view of the knife holding frame, taken on line 5—5 of Fig. 1, and Fig. 6 is a bottom plan view thereof, on line 6—6 of Fig. 5.

As shown in the drawings, the device of this invention comprises a platform 10 on which the large slice of material such as a slice of watermelon (11, Fig. 1) from which the individual sectional slices are to be fabricated, is positioned. Said platform may be rotatably positioned in turn, on the frame 12, and may be rotated manually or by a suitable automatic indexing means (not shown) so as to locate the center line of the section to be cut at approximately the point 13 shown in Fig. 2 in line with the recess 14 (Figs. 2, 3 and 4) of the holder 15 for handles, so that a handle may be projected into said cut slice the handle may be stacked pyramidally in said holder 15 between the guides 37 so that the lowermost handle will drop into the recess 14 of holder 15 and will be projected therefrom (by rod 43) into the slice section cut by the knife 16 as below described.

Pursuant to the invention, a knife 16 (Figs. 1, 5 and 6) of the outline of the section to be cut, is mounted on a plunger 17 as for example, by securing the knife to a frame 18, in turn secured to plunger 17. The plunger 17 may be reciprocally disposed in a bearing 19 suitably mounted, as by arm 20, on frame 12, and the plunger 17 (and therefor the knife 16) may be reciprocated by any suitable means, such as lever 21 pivoted as at 22 and engaging a pin 23 on the plunger 17, the spring 24 bearing at opposite ends against said pin and against the bearing 19. The knife is thus mounted adjacent and inwardly of the perimeter of the platform 10. The knife 16 is, as shown in Fig. 6 of generally triangular outline as noted at 25 in said figure, to define the body of the slice to be cut, and is extended at the base of the triangle to define a throat portion 26 forming an extension of the base of the triangular section cut. It is into this throat portion that the handle is inserted by means such as presently described. The knife is, as shown in Fig. 5, formed approximately of a height equal to the thickness of the piece to be cut. The frame 18 for the knife also may be provided with a web 27 in which a pair of rods 29, 28 are reciprocably positioned. The position of the rods shown in Fig. 5 is their extreme position of movement responsive to the springs 30 and 31, the rods being limited in movement in that direction (urged by the springs) by the pins 32, 33 engaging web 27, and being movable in the opposite direction to project through and above the web 27 when the plate 34 (Fig. 6) fixed to the lower ends of the rods, abuts the top of the slice 11 on the descent of the frame 18. Thus the plate 34 is the first element to contact the slice 11 on descent of the plunger 17, and it holds the slice 11 against the platform 10 while the knife 16 cuts through said slice. The frame 18 is further provided with a bar 35 secured thereto and provided with a pointed edge 36 (Fig. 6) which may be, as shown in dotted lines, Fig. 5, in the form of a pair of projections adapted to partially penetrate the slice 11 and hold it in position while the knife descends to completely cut the same and during the step of inserting the handle therein. The handle to be inserted into the section may, as shown in Fig. 4 be stacked pyramidally between the guides 37, the lowermost handle dropping into the channel or recess 14 in the holder 15 in direct axial line with the center 13 of the section as will be apparent from a consideration of Figs. 4 and 2 of the drawings. In order to insure the location of only one handle in the channel for each slice cut by knife 16, from section 11, the holder 15 is provided with a selecting means such as nosing element 38 (Fig. 4) which normally (due to spring 42) blocks the recess 14 to prevent handles from dropping thereinto. Means are synchronized with the movement of the knife to displace the nosing element 38 from the plane of the recess 14 once during each cycle of cutting the slice by the knife, so as to allow one handle to drop into said recess during each such cycle. Said means may comprise, as shown in Fig. 1, an arm 39 secured to the frame 18 or to the plunger 17 on which the knife is mounted, and having the end 40 engageable (Fig. 4) with the nosing 38 once during each cycle of descent of the knife 16, rotating nosing 38 which is pivotally mounted as at 41 and is spring urged as by the spring 42 into the plane of the recess 14 (clear of recess 14). A rod 43 is reciprocably mounted in line with the recess 14 in the holder for handles, and means reciprocated in said recess to project the handle from the recess and into the section cut from the slice 11. Said means may comprise a lever 44 (Fig. 1) pivoted as at 45 in the frame 12 and normally urged by the spring 46 engaging the lever and frame at opposite ends, to the inoperative position. To move the rod 43 against the handle disposed in rod holder recess 14 and thereby project the handle therefrom, the lever 44 is depressed as by the foot pedal 47. A suitable linkage or cable 48 is connected to the rod and to the lever as at 49, 50. The rod 43 may be reciprocably journalled in a bearing 51 mounted on the rod holder and may be further provided with a slide 52 rotatably journaled in a bearing 53 (Fig. 1). A spring 54 may be connected at opposite ends to the slide 52 and bearing 53 to assist in returning the slide to the inoperative position shown in Figs. 1 and 4.

The operation of the device is relatively simple and accurate, the operator needing only to position the slice 11 to be cut into sections on the platform 10, move the lever 21 downwardly so that the knife 16 will cut the desired section from the slice 11, and operate the lever 44 as by the foot pedal 47 to project the handle into the cut slice. It will be obvious that suitable timed motor means may be connected to lever 21 and rod 43 to effectuate automatically the operation of the device of this invention within the spirit and scope of the invention. When the lever 21 and foot pedal 44, 47 are released, they return to their inoperative position shown in Fig. 1. The platform 10 may be rotated to turn the slice 11 to a position in which the contiguous portion adjacent the section just cut is located in registry with the knife 16, and the operation repeated.

Having thus described my invention, what I claim as new and desire to secure by Letters Patent is:

1. A machine for fabricating individual sections of uniform outline from a larger slice of material, comprising a platform on which said slice may be positioned, a plunger reciprocably mounted on said machine over the slice, a knife of the outline of the section desired secured to said plunger, spring urged means holding the slice in position on the platform, means for moving said knife through the slice to cut the section therefrom while the section is so held, a holder for handles for said slices positioned adjacent said platform, and means to project a handle from the holder and into the cut section, to complete the section as one cut to the outline of the knife, with a handle therein to facilitate handling.

2. In a machine as set forth in claim 1, said holder for said handles being provided with a recess for reception of a single handle, guides in said holder to incline handles positioned therein toward the recess to drop thereinto, a nosing element mounted in said holder and normally projecting into the plane of said recess to prevent handles from dropping thereinto, and means synchronized with the movement of the knife to displace the nosing element from the plane of the recess once during each cycle of cutting of the slice by the knife to allow one handle to drop into said recess during such cycle.

3. In a machine as set forth in claim 1, a frame secured to said plunger, the knife being secured to the frame and thereby to the plunger, and a bar secured to said frame and provided with a pointed edge, said pointed edge being disposed in the plane of the knife so as to move into and hold the slice of material while the handle is positioned therein.

4. In a machine as set forth in claim 2, said means to project the handle from the holder into the cut section including a rod reciprocably mounted in line with the recess in the holder for handles and means engaging the rod to reciprocate the same through the holder recess to project a handle therein therefrom and into the slice.

References Cited in the file of this patent

UNITED STATES PATENTS

| | | |
|---|---|---|
| 1,756,375 | Million | Apr. 29, 1930 |
| 2,145,965 | Beatty | Feb. 7, 1939 |
| 2,711,020 | Hastings | June 21, 1955 |
| 2,740,117 | Smith | Apr. 3, 1956 |